No. 613,913. Patented Nov. 8, 1898.
C. B. ROYAL.
BALL BEARING CENTER PLATE FOR CARS.
(Application filed Oct. 1, 1898.)
(No Model.)
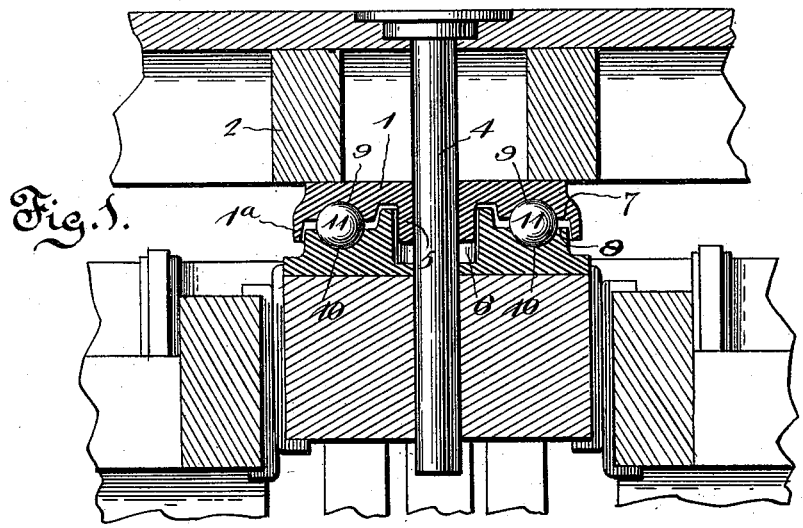
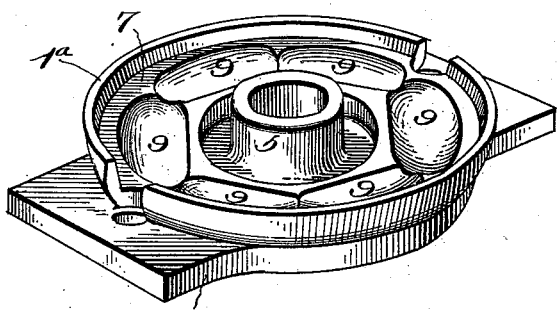
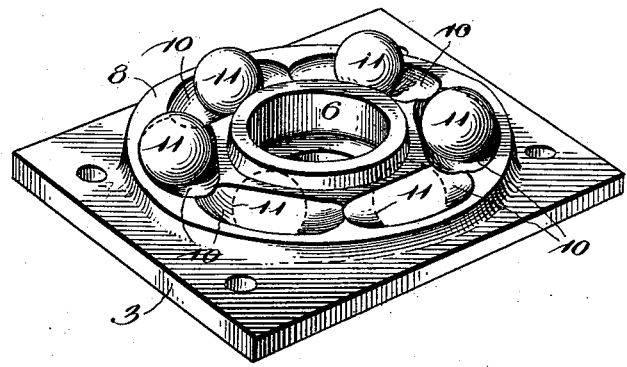
Witnesses Charles B. Royal, Inventor.
By his Attorneys,

UNITED STATES PATENT OFFICE.

CHARLES B. ROYAL, OF PORTSMOUTH, VIRGINIA.

BALL-BEARING CENTER-PLATE FOR CARS.

SPECIFICATION forming part of Letters Patent No. 613,913, dated November 8, 1898.

Application filed October 1, 1898. Serial No. 692,363. (No model.)

*To all whom it may concern:*

Be it known that I, CHARLES B. ROYAL, a citizen of the United States, residing at Portsmouth, in the county of Norfolk and State of Virginia, have invented a new and useful Ball-Bearing Center-Plate for Cars, of which the following is a specification.

The invention relates to improvements in ball-bearing center-plates for trucks.

The object of the present invention is to improve the construction of center-plates for trucks and car-bodies and to provide ball-bearing center-plates adapted to reduce friction to a minimum and capable when a truck turns incident to a car rounding a curve of automatically elevating the car-body, whereby the truck will be permitted to adjust itself freely to the change of direction of the track and the car-body will right itself without friction as soon as the truck straightens to its normal position.

The invention consists in the construction and novel combination and arrangement of parts, as hereinafter fully described, illustrated in the accompanying drawings, and pointed out in the claims hereto appended.

In the drawings, Figure 1 is a vertical sectional view of a portion of a truck and a car-body provided with center-plates constructed in accordance with this invention. Fig. 2 is a detail perspective view of the body center-plate. Fig. 3 is a similar view of the truck center-plate.

Like numerals of reference designate corresponding parts in all the figures of the drawings.

1 designates a body center-plate secured to a car-body 2 in the usual manner and pivoted to a truck center-plate 3 by a king-bolt or center-pin 4, passing through registering openings of the center-plates. The body center-plate is provided with a depending annular flange 5, which fits in an annular flange 6 of the truck-plate in the usual manner.

The upper and lower center-plates are provided with annular bearing portions 7 and 8, provided with annular series of pockets 9 and 10 of substantially elliptical shape and tapering in depth from the center to the ends and receiving antifriction devices 11, such as balls; but cylindrical or conical rolls may be provided, if desired. The annular series of antifriction devices support the bearing portions of the center-plates out of contact with each other and provide a frictionless bearing, so that the friction between the center-plates is reduced to a minimum. Instead of employing one series of antifriction devices two or more may be provided, if desired. The body center-plate is provided at its periphery with a depending annular flange $1^a$, which extends below the bearing-face of the truck center-plate, as clearly shown in Fig. 1 of the drawings, and it forms a dust-guard for excluding sand, dirt, and the like from the bearing. The sand and dirt drawn under the cars by the motion thereof will strike the dust-guard flange $1^a$ and drop back without entering the bearing, and any sand or dust entering the space below the flange $1^a$ will be shed and forced outward by the inclined side face of the enlargement or bearing portion of the truck center-plate.

The tapering pockets which receive the antifriction devices form oppositely-disposed inclined faces, and when the truck turns incident to a car rounding a curve the antifriction devices ride up the inclined end faces of the pockets and elevate the car-body and leave the truck perfectly free to turn and prevent the car-body from grinding against the side bearings and retarding the pivotal movement of the truck. After the car has passed around a curve and the truck straightens out the car-body will immediately right itself and will not cause the wheels of the truck to bind against the rails, as would be the case were the truck prevented from straightening out fully. This result will be facilitated by the balls or antifriction devices being drawn by gravity to the centers or lowest portions of the pockets, and when the balls are centered therein the car-body will be in proper position with relation to the truck.

The invention has the following advantages: The ball-bearing center-plates, which are simple and inexpensive in construction, are not materially weakened by the pockets, and they do not in any manner necessitate alteration in the present form of trucks and car-bodies, and while they reduce the friction on center-plates to a minimum they also provide means for elevating the car-body as a truck turns, so that the said body will offer no resistance to the movements of the truck. By permitting the truck to turn freely in rounding curves the flange friction on the rails is reduced to a minimum, the life of the rails is greatly increased, and the flanges are prevented from becoming worn and sharp, thereby greatly increasing the durability of car-wheels. Cars are enabled to run much more smoothly than with the present construction of center-plates, and the consumption of coal will be correspondingly reduced.

Changes in the form, proportion, and minor details of construction may be resorted to without departing from the spirit or sacrificing any of the advantages of this invention.

What is claimed is—

1. A device of the class described comprising upper and lower center-plates designed to be mounted respectively on a car-body and a truck and provided in their bearing-faces with pockets forming oppositely-inclined faces, and antifriction devices interposed between the center-plates, arranged in the pockets and adapted to ride up the inclined faces, whereby when a truck turns the car-body will be elevated to relieve the side bearings, substantially as described.

2. A device of the class described comprising upper and lower center-plates designed to be mounted on a car-body and a truck, and provided in their bearing-faces with tapering elliptical pockets arranged in an annular series and forming inclined end faces, and antifriction devices interposed between the plates, arranged in the pockets and adapted to ride up the inclined faces, substantially as and for the purpose described.

3. A device of the class described comprising a body center-plate, a truck center-plate, and means for automatically elevating the body center-plate when the truck center-plate turns, whereby the side bearings of a truck will be relieved of friction to permit the truck to turn freely, substantially as described.

In testimony that I claim the foregoing as my own I have hereto affixed my signature in the presence of two witnesses.

CHARLES B. ROYAL.

Witnesses:
 JOHN H. SIGGERS,
 THEODORE DALTON.